United States Patent [19]

Boyer

[11] Patent Number: 4,536,668
[45] Date of Patent: Aug. 20, 1985

[54] VEHICLE MOUNTABLE ELECTRICAL GENERATING SYSTEM

[76] Inventor: Robert E. Boyer, 2650 Davisson St., River Grove, Ill. 60171

[21] Appl. No.: 417,473

[22] Filed: Sep. 13, 1982

[51] Int. Cl.³ .............................................. H02K 7/10
[52] U.S. Cl. .................................. 310/75 R; 310/83; 310/89; 310/90; 310/268; 74/752 F; 180/65.5; 322/3
[58] Field of Search ......... 310/89, 67 R, 74, 168–171, 310/75 A, 90, 75 R, 75 C, 268, 83, 115, 118, 68 B; 322/3; 74/752 F; 340/58; 180/65.5; 307/9, 10 R; 190/1 R

[56] References Cited

U.S. PATENT DOCUMENTS

| | | | |
|---|---|---|---|
| 2,638,274 | 5/1953 | Engler | 235/95 C |
| 3,178,686 | 4/1965 | Mills | 340/58 |
| 3,544,822 | 12/1970 | Pickles | 310/268 |
| 3,566,165 | 2/1971 | Lohr | 310/75 |
| 3,588,815 | 6/1971 | Koonce | 200/61.25 |
| 3,812,928 | 5/1974 | Rockwell | 310/67 R |
| 3,860,772 | 1/1975 | Byrd | 200/83 N |
| 3,897,843 | 8/1975 | Hapeman | 310/83 |
| 3,930,224 | 12/1975 | Whiteing | 340/58 |
| 4,021,690 | 5/1977 | Burton | 310/83 |
| 4,075,603 | 2/1978 | Snyder | 200/61.25 |
| 4,163,208 | 7/1979 | Merz | 340/58 |
| 4,229,728 | 10/1980 | Tremba | 340/58 |

Primary Examiner—R. Skudy
Attorney, Agent, or Firm—Leo J. Aubel; Robert E. Wagner

[57] ABSTRACT

A vehicle-mountable electrical power generating mechanism and signal transmitter, combined to constitute a self-powered generating system mountable such as on a wheel to monitor and provide an indication of certain operating characteristics of the wheel, such as the pressure of the tire mounted thereon.

17 Claims, 12 Drawing Figures

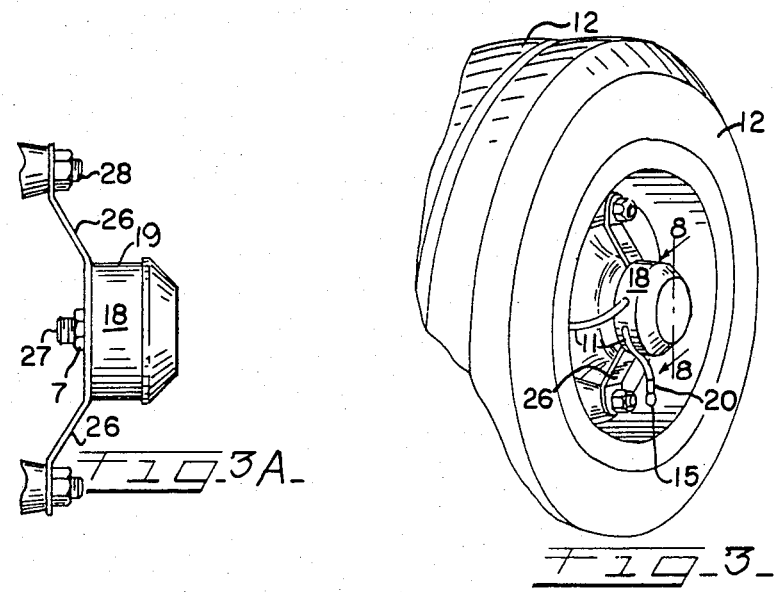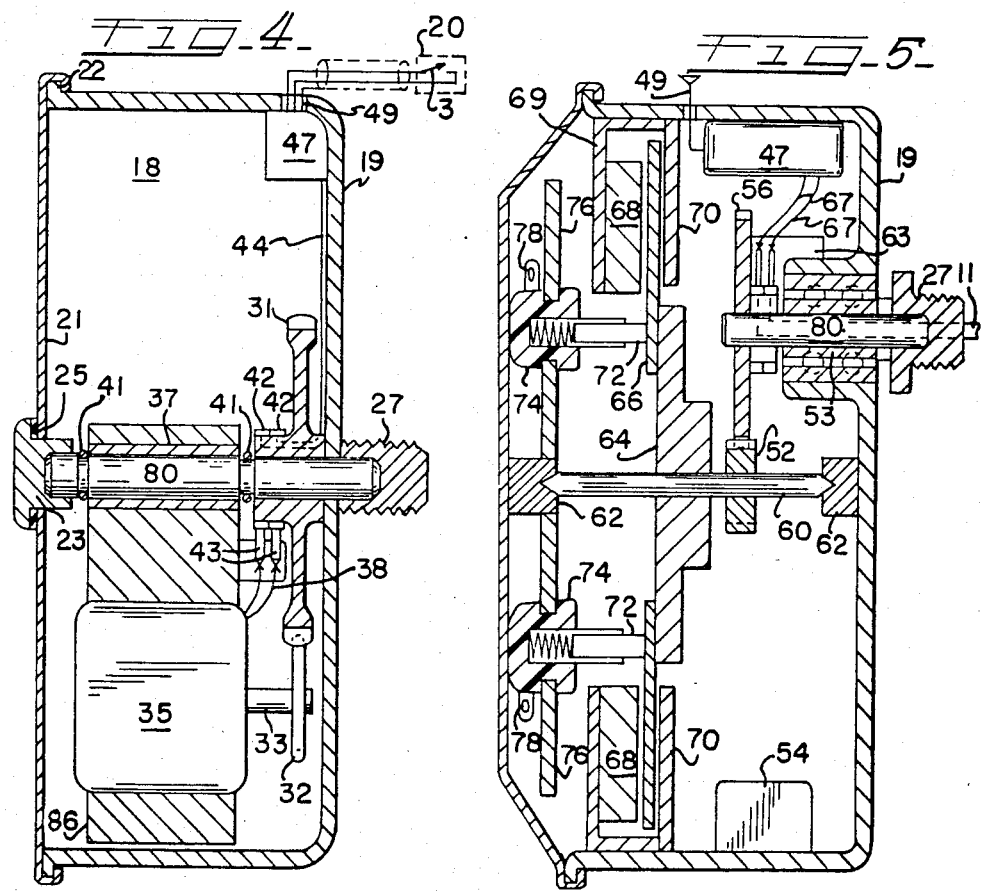

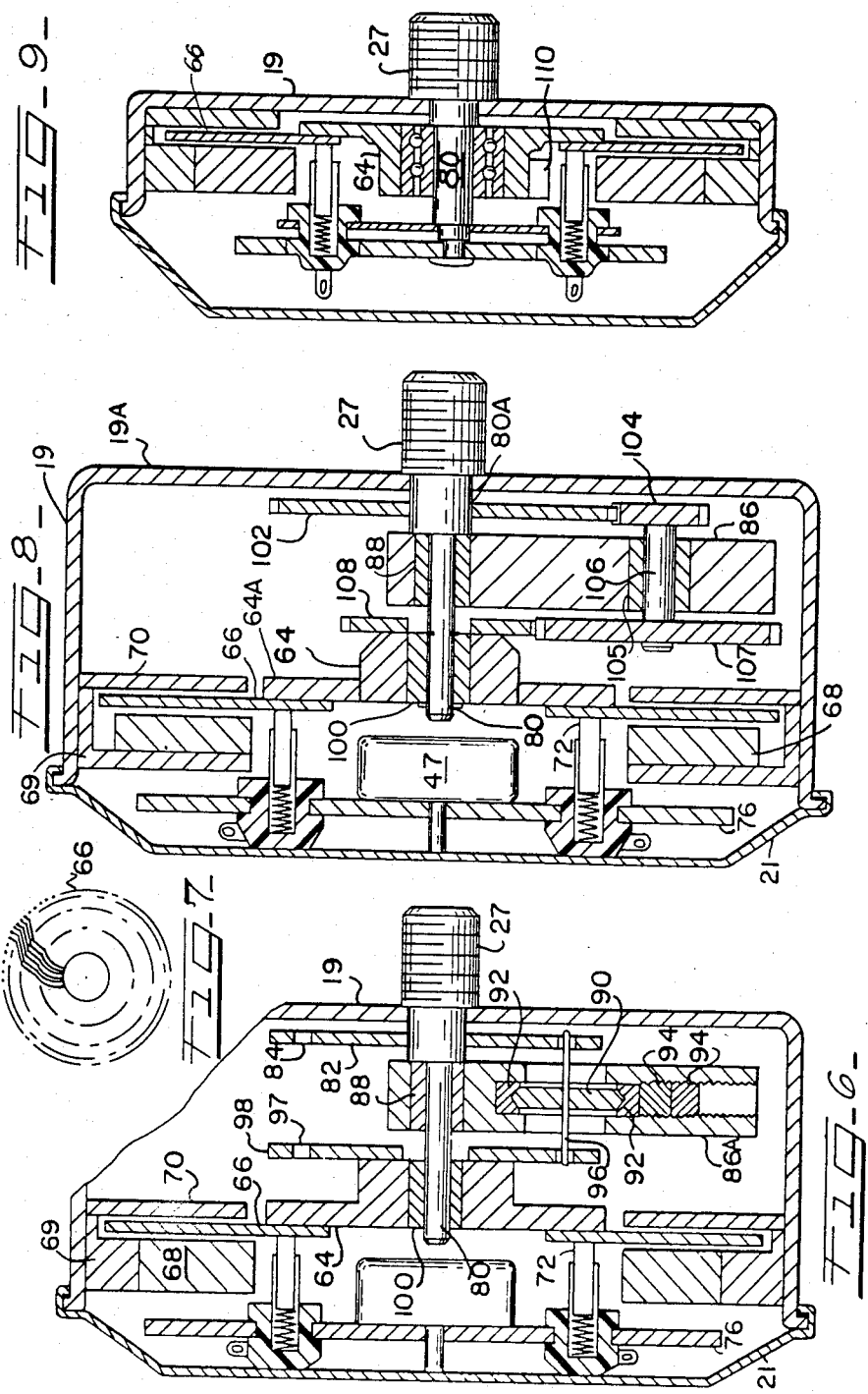

VEHICLE MOUNTABLE ELECTRICAL GENERATING SYSTEM

DESCRIPTION

1. Technical Field

A driveless electrical generator mounted on a rotatable body, such as a vehicle wheel, for providing power to a system which monitors and provides operating information such as the fluid pressure of a pneumatic tire mounted thereon.

2. Background Prior Art

There is a need for a reliable, low-cost, easily installed and maintained device to monitor and warn of unsafe conditions in wheels and tires of motor vehicles. A principal limitation of prior art devices lies in the lack of a reliable power source for the device since all such devices must actuate some form of audible or visual alarm means. The preferred alarm system typically involves some sort of radio transmitter mounted on each wheel and broadcasting a warning signal to a stationary receiver mounted somewhere on the vehicle. Here, electrical power must be supplied to operate the transmitter.

Several of the earliest types of prior art monitoring systems are battery-powered, such as disclosed in U.S. Pat. Nos. 3,178,686 and 3,588,815. The battery-operated systems, while being technically feasible, have not found any degree of acceptance because of various limitations. One of the significant limitations is that a battery is subject to aging, and must frequently be replaced to assure operation of the system; also, a battery takes up substantial installation space. Further, in such battery-type systems, the batteries are normally mounted in close proximity within the wheel, and are difficult and inconvenient to remove and replace. Irrespective of inconvenience of replacement, all commonly available batteries have an additional fundamental limitation: they freeze and become inoperative under severe winter driving conditions. Thus, proposals have been made for developing a system which is not dependent upon a battery for its power to operate the associated signal transmitter. Such systems typically employ an integral electrical generator of one form or another for producing a local electrical voltage to power the device, the necessary relative movement between stator and armature element being provided by rotation of the vehicle wheel on which the unit is mounted as the vehicle is traveling.

Several such generating systems adopt a fixed reference mechanism of the type disclosed in U.S. Pat. No. 2,638,274, issued to Engler, wherein a hub-mounted odometer employs a pendulum weight journaled to rotate about an axis in a housing, the housing being affixed to a wheel, with the pendulum journal axis disposed in prolongation of the center of the wheel hub. As the wheel rotates, the housing rotates with it, the pendulum remaining substantially stationary in the housing. The relative motion between housing and pendulum is coupled to drive the odometer. One electrical generating system using this principle is disclosed in U.S. Pat. No. 4,075,603, issued to Snyder, et al. In this system, a stator winding of generally toroidal configuration is axially mounted to be rotated about the axis of the toroid as the vehicle wheel rotates. A multi-pole permanent magnet rotor is mounted to be freely rotatable about the same axis, the magnet being held substantially stationary during wheel rotation by means of an offset pendulum weight. A similar generator to that of Snyder is disclosed by Tremba in U.S. Pat. No. 4,229,728.

Another example of a vehicle-mounted electrical power generating system is disclosed in U.S. Pat. No. 4,163,208 to E. J. Mertz. Mertz mounts the coil and the permanent magnet so that they are maintained in a predetermined spaced relationship on the fixed portion of the vehicle and the movable portion of the wheel.

A principal limitation of the prior art systems is the fact that, at low vehicle speeds, the electrical generating system provides inadequate operating voltages to associated signaling devices. A partial solution to this problem would be to provide a floating rechargeable battery across the generator output circuit, to be charged while the wheel is rotating at high speed, the generator being cut out, by means known to the art, at low speeds, or when the vehicle is stopped. However, in such systems, low temperatures seriously deteriorate the power of the battery. Moreover, such an approach is predicated on the assumption that the vehicle will, over a given time interval, be driven at high speeds long enough to adequately charge the battery. In the case of vehicles which spend a considerable portion of their daily road mileage in dense urban areas in slow-moving traffic, such conditions may not be achieved. Therefore, there is a present need for a unit to provide adequate electrical power output at low, as well as high, vehicle speeds.

SUMMARY OF THE INVENTION

According to the present invention, a vehicle mountable self-powered signal generating and transmitting system is enclosed in a housing which is readily adapted to be attached to a rotating member. The system provides a sensing signal representing the condition of the vehicle, such as the condition of the tire, and transmits the signal to a receiver on the body of the vehicle and thence to a display in the vehicle cab.

In a preferred embodiment of the invention, the inventive generator consists of a housing attached to the center of the rotatable wheel to rotate therewith, and which has a pendulum weight or support member mounted on an axis within the housing, the pendulum axis being aligned with the axis of the wheel so that the pendulum remains stationary while the wheel rotates. A gear system, cooperating with the pendulum, drives a pancake armature in an overspeed relation to the rotation of the housing to generate electrical power.

In another embodiment of the invention, the housing itself is freely mountable in an offset position about the wheel axis to depend therefrom as a pendulum, rotational drive being supplied from a mounting shaft fixed along the wheel axis and rotating with the wheel. Internal gearing drives a pancake armature into rotation with respect to a magnetic structure fixed in the housing, again at a substantially higher speed than the wheel rotation rate. Other embodiments of the internal pendulum type drive similar pancake generators into overspeed rotation.

In another embodiment, an electrical generator mounted on the pendulum is rotated by a drive gear engagement of the generator shaft with a drive gear mounted on said axis and fixedly attached to the housing. Power takeoff to a transmitter mounted in the housing is by conventional slip rings. The gear engagement is designed to drive the generator at a rotational speed well in excess of the wheel rotation rate.

In one application of the embodiments of the invention, a pressure transducer is attached to a valve stem of a tire to monitor the pressure therein. When the pressure increases beyond a desired level or drops below a desired level, a transmitter provides a signal warning of the change to a receiver unit to give the operator a visual or audio indication of the operating condition for the particular tire.

The same concept can be utilized to monitor various other conditions of the vehicle, such as its speed, the number of miles that the vehicle has been driven, or abnormal vibrations by using sensors of types well-known in the art.

BRIEF DESCRIPTION OF SEVERAL VIEWS OF DRAWINGS

FIG. 3 is a perspective view of one wheel of the vehicle having the preferred inventive electrical power generator mounted thereon;

FIG. 3A is a side elevational view, showing further details of one manner of mounting the preferred inventive generator on the wheel of the vehicle;

FIG. 4 is a partial cross-sectional view, showing the interior details of another embodiment of the invention;

FIG. 5 is a similar view of a third embodiment of the invention, using a non-rotating offset housing, the armature being of a "pancake" type;

FIG. 6 is a similar view of a fourth embodiment of the invention, using a rotating housing and a pendulum assembly carrying a sprocket gear transmission;

FIG. 7 is a plan view of a typical pancake armature;

FIG. 8 is a view in cross-section of the embodiment of the invention of FIG. 1, taken along Line 8—8 of FIG. 3;

FIG. 9 shows another embodiment of the invention, employing a non-rotating armature carrying a pendulum weight;

DETAILED DESCRIPTION

Figure 10:
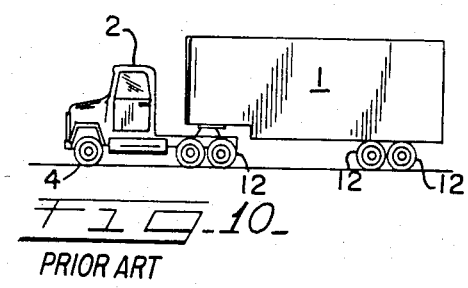
FIG. 10 shows the type of known environment in which the present invention is used.

As will be described fully hereinbelow, the present invention comprises a device which is mounted on the wheel of a vehicle, such as a truck. Refer first to FIG. 10 of the drawings, which generally discloses a vehicle environment for the present invention, and more particularly a semi-trailer truck, generally designated by reference number 1. As is common, vehicle 1 has a cab 2, with two steerable wheels 4 under the cab and sets of dual wheels 12 supporting the tractor.

As is well-known, the tires for these types of vehicles are very expensive; and, thus, it is desirable to obtain a maximum amount of mileage for any given tire. Also, importantly, if one or more tires of the vehicle are "flat", or not fully inflated, safety may be compromised. To obtain maximum tire mileage, to improve the operation of the vehicle from a safety aspect, and to reduce maintenance costs, the structural integrity of the tire must be maintained; and, preferably, should be monitored continuously. One of the most significant factors is to maintain proper tire pressure at all times since an undetected loss in pressure leads to operational problems, such as a rise in temperature and an increased rolling resistance, resulting in increased fuel consumption, reduced vehicle reduction and steering control and stability, potential loss of tire structural integrity, and generally reduced vehicle capabilities.

In order to monitor tire pressure and other conditions for a vehicle, U.S. Pat. No. 3,930,224, issued to R. G. Whiting, entitled Transmission of Information (incorporated herein by reference), discloses an overall circuit which is capable of monitoring various conditions for numerous tires on the vehicle. However, as indicated therein, one of the difficulties that has been encountered in implementing such a system from a practical and operational standpoint is in mounting the transmitting unit in a closed and protected area on the vehicle wheels.

Figure 2:
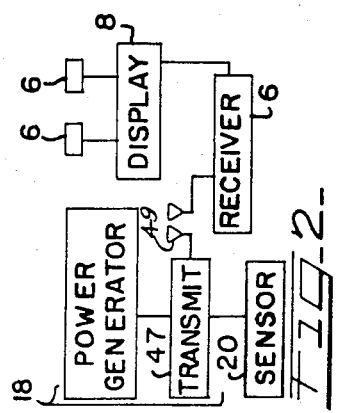
FIG. 2 is a functional block diagram of the elements of the electrical system.

Refer now to the schematic circuit of FIG. 2, useful in the present invention, and which shows a plurality of radio frequency receiver units generally labeled 6 which are operatively interconnected to a central display unit 8 that is preferably located in the cab of the vehicle. Each of the receiver units 6 is positioned adjacent the respective wheels of the vehicle, and is supported on the frame for receiving a signal that is transmitted by a wheel-mounted signal generating device, including an electrical energy generating device or power generator 18. According to the present invention, such signal generating system includes an electrical potential or energy generating means that is enclosed and sealed within a housing that is readily attached to a wheel at an exposed location, and incorporates a transmitter 47 that is capable of transmitting a signal to each of signal receiving units 6.

Figure 1:
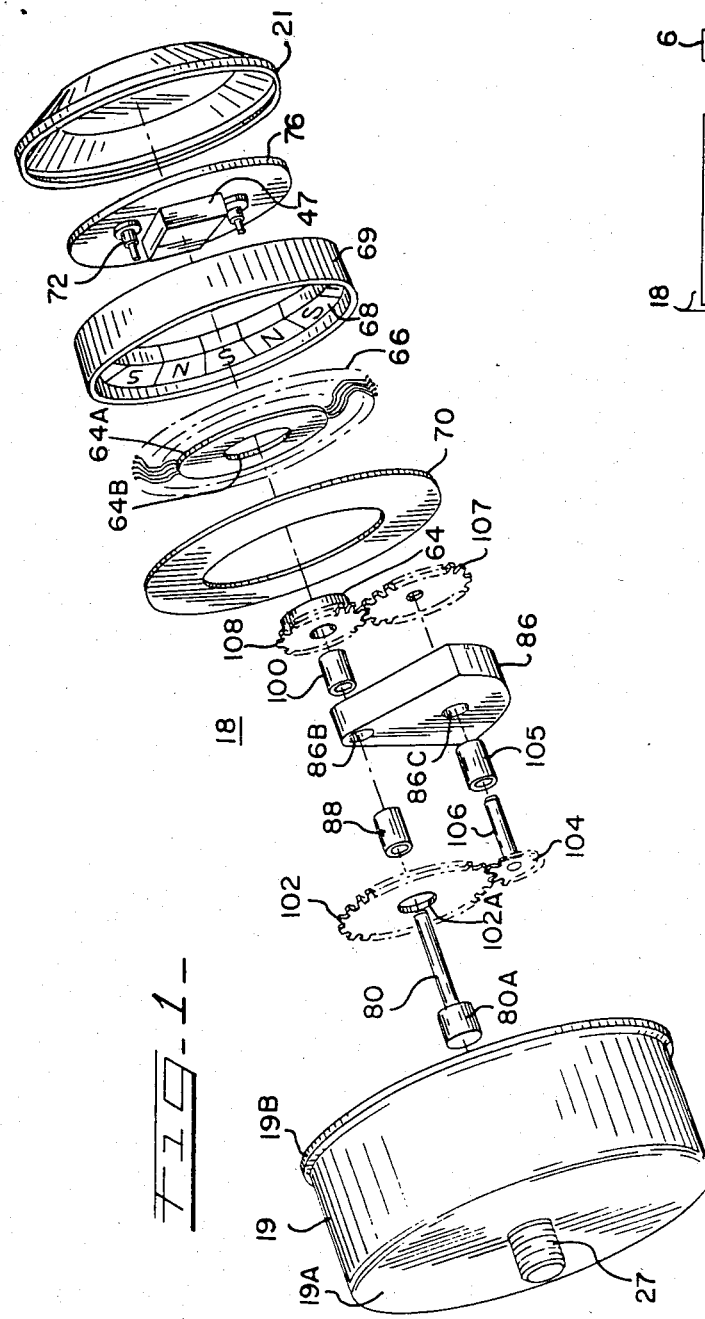
FIG. 1 is an exploded perspective view of one embodiment of the invention.

Refer now to FIGS. 1 and 8, which illustrate an electrical energy generating unit 18, in accordance with the invention. Unit 18 includes a casing or housing 19 that is cylindrical in shape and having a closed end 19A and an open end, not numbered. FIG. 8 is a view in cross-section of the unit 18 of FIG. 1, showing the cooperative detail of the assembled elements of the unit.

A mounting stud 27 is axially affixed to the outer surface of closed end 19A. A ring or flange 19B is formed along the periphery of the open end to provide a means of securing a cover 21 to the casing 19. A shaft 80 is axially affixed in line with mounting stud 27. The shaft includes an enlarged end or shoulder 80A. A circular drive gear 102 is fixedly mounted by its axial aperture 102A on the enlarged end 80A of shaft 80. As can be appreciated, the shaft 80 will rotate when the mounting stud 27 and housing 19 rotate. Likewise, gear 102, mounted on enlarged end 80A, also rotates with shaft 80 and casing 19.

A weight is slideably mounted by bearings 88 on shaft 80 as a pendulum 86, and remains relatively stationary when shaft 80 is rotated. A driven gear 104, mounted on one end of a shaft 106, extends through aperture 86C in pendulum weight 86. Gear 104 is engaged and driven by gear 102. Shaft 106 is affixed at its other end to gear plate 107. Gear 107 engages and drives gear 108, which is mounted by bearings 100 on shaft 80. Note that other suitable bearings, labeled 88 and 105, are mounted on shafts 80 and 106, respectively, to enable proper rotating relation between parts.

Rotation of gear 102 causes gear 104 to rotate, which in turn causes shaft 106 and the second drive gear 107 to rotate. Rotation of gear 107, in turn, drives second driven gear 108 to rotate at a desired overspeed dependent on the selected gear ratios between gears 102 and 104, and between gears 107 and 108. Note that pendulum 86 and gear 108 are slideably mounted or journaled on shaft 80 by bearings 88 and 100, respectively, and do not rotate with shaft 80. More specifically, pendulum 86 remains in a relatively stationary (that is, non-rotating) condition; and gear 108 rotates at a speed higher than the speed of rotation of the shaft, dependent on the selected diameters and gear ratios, as stated above. In the embodiment of FIGS. 1 and 8, gear 102 is several times larger in diameter than gear 104; and, hence, gear 104 rotates at a correspondingly higher rate of speed than gear 102, or in an "overspeed" relation.

Gear 108 includes an axially extending portion 64, which is fixedly received in aperture 64B of hub 64A of a pancake armature 66. Thus, pancake armature 66 rotates with gear 108. The armature is mounted in close propinquity to and facing permanent magnet pole pieces 68 and within circumferential magnet holder 69. The pole pieces 68 are mounted along the inner periphery of holder 69. A plate 70 provides a magnetic return structure, i.e., a return flux plate, and is positioned adjacent the opposite side of the armature on the periphery of the holder 69. The pancake armature 66 is thus rotated adjacent the magnetic pole pieces 68 at an overspeed relation to the pole pieces, as compared to the rotation of the casing 19. As is well-known, as the armature 66 rotates in the magnetic field produced by the array of magnets or pole pieces 68, an electrical potential is generated. Electric brush assemblies 72, mounted on dielectric disc 76, bear against the pancake armature to couple the electrical potential to a transmitting system 47, as will be described hereinbelow.

The pancake armature 66 is shown in somewhat more detail in FIG. 7, and is of conventional multi-layer design specifically suited to those applications where minimal armature volume is desirable.

It should be recognized that the diameters of gears 102 and 104 must be different in order that an overspeed function be obtained and that armature 66 is rotating faster than the shaft 80 and casing 19. Also, the gear ratios of gears 107 and 108 are selectable, dependent on the speed of rotation desired.

As illustrated in FIGS. 3 and 3A, the casing or housing 19, which is preferably circular in plan view, has a substantially U-shaped bracket 26 secured to the exterior surface thereof through stud 27 and nut 7. The bracket 26 has two legs that are respectively attached to the rim of a wheel, such as dual wheel 12, by suitable studs 28. The casing 19 of the electrical energy generating device 18 has a pair of flexible electrical conduits 11—11, respectively connecting electrical leads to pressure sensing switches in a sensor 20, mounted on valve stems 15 of the respective tires on wheels 12 and connected internally in the housing 19 to actuate the transmitter 47 (see also FIG. 2).

In operation, and as the vehicle is being driven along the road, electrical power is being constantly supplied by the inventive generating system to power the radio frequency transmitter 47. A suitable control signal is passed into the radio frequency transmitter 47, such as from a tire valve sensor as disclosed in U.S. Pat. No. 3,860,772 (incorporated herein by reference), and as indicated in FIG. 2 herein, to actuate the transmitter. Thus, with the vehicle in motion, the generator provides power to the system, including the transmitter 47, which, in conjunction with the sensor 20, continuously monitors a predetermined condition in a given tire to produce a warning signal broadcast out of antenna 49, to be picked up by a receiver 6 and an audio/visual display unit 8 to serve as a warning to the vehicle operator. The transmitter 47, the antenna 49, the receiver 6 and the display unit 8 may all be items well-known in the art.

Note, in FIG. 4, that the transmitter 47 and the antenna 49 may be mounted on the pendulum 86. However, in such arrangement, means would have to be provided to pass the sensor signal to the now stationary radio transmitter. A stationary antenna may be mounted upon the pendulum element 86, the only restriction being that at least a substantial portion of the housing 19 or the cover 21 be of substantially electrically non-conducting material to satisfactorily enable signal emission from the housing assembly.

The pressure sensors 20 contain adjustable electrical switches that open or close at settable threshold tire pressures, one such assembly being functionally designated as a switch means 3 (see FIG. 4). The pressure sensors 20 continuously monitor the pressure for each of the tires, and may be of any suitable known type, as, for example, shown in U.S. Pat. No. 3,860,772, issued to Byrd and incorporated herein by reference.

According to the present invention, signal generating device 18 is a completely enclosed, self-powered unit that can be readily attached to the hub or other portion of a wheel, and which is capable of powering a transmitter and/or a sensor for monitoring any desired condition according to the type of sensor employed.

FIG. 4 is a view in cross-section of another embodiment of the invention. In FIG. 4, the assembly 18 includes the cup-shaped housing 19, which has the open end thereof covered with a cover 21, which is secured, as at 22, to provide a weather seal. A central support bushing 23, also weather-sealed as at 25, extends through a centrally positioned hole on the cover 21. Support bushing 23 is recessed to receive one end of a shaft 80, which is affixed to mounting stud 27. Rotation of the associated wheel (FIG. 3) thus serves to rotate the housing 19, causing shaft 80 to rotate synchronously therewith.

A spur drive gear 31 is fixedly mounted on shaft 80 and rotates therewith. An electrical generator 35, of suitable known design, is mounted on a pendulum weight 86, which is freely rotatable about shaft 80 on bearing 37. The axial position of the pendulum weight on the drive shaft is constrained by retainer rings or washers 41. As the housing 19 rotates, shaft 80 and its affixed drive gear 31 also rotate. The generator 35, however, being disposed at the end of pendulum 36, remains substantially stationary with respect to shaft rotation in position at the lower portion of the housing 19. The generator 35 is thus mounted in a para-axial relation to the axis of rotation of the wheel; that is, the axis of rotation of the generator is offset from or eccentric to the axis of rotation of the associated wheel. Generator shaft 33 is driven to rotation with respect to the generator 35 by engagement of a driven gear 32 compatible with the rotating drive gear 31. The generator output is coupled by leads 38 to brushes 43, contacting slip rings 42 rigidly affixed to the hub of drive gear 31. Power takeoff may be derived from the slip rings 42 by a variety of means, which may involve passage through the hub of the gear 31, as indicated schematically by the dotted lines, to couple electrical power to transmitter 47 through leads 44 mounted on the wall of housing 19. From the relative diameters of gears 31 and 32, it will be seen that the generator shaft 33 is driven at a substantially higher rate of speed than the wheel rotation rate.

FIG. 5 shows another embodiment of the inventive structure, wherein the housing 19 is stationary. In the embodiment shown in FIG. 5, the housing assembly is freely rotatable on sealed bearing 53 about shaft 80, which extends axially from the mounting stud 27. The disposition of the masses of the remaining components of the housing, as well as an optional eccentric weight 54 insures that, as the tire of the vehicle rotates to drive stud 27 to rotation, the housing 19 will remain in a substantially stationary position, with the appropriate weight 54 continuously disposed closest to the ground. The shaft 80, affixed to the mounting stud 27, carries the rotation of the mounting stud to a drive gear 56, which in turn drives driven gear 52 to rotate an armature shaft 60, supported at both ends by spindle bearings 62. Rotation of shaft 60, in turn, causes an affixed armature hub 64 and pancake armature 66 into rotation. The array of magnetic pole pieces 68 is mounted on holder 69 opposite the flux return plate 70. As stated above, rotation of armature 66 through the magnetic field induces an electrical voltage in the armature, which is picked off by spring-loaded brushes 72 carried by brush carriers 74 mounted on a brush carrier plate 76. Electrical leads (not shown) conduct electrical power from lugs 78, connected to the brush carriers 74 and leading to the transmitter 47.

In this embodiment, electrical conduits 11 enter the housing 19 through the mounting stud 27; and, by means of brush slip rings and leads 67, communicate the appropriate information from sensor 20 to transmitter 47 for logic determination. In FIG. 5, the transmitter 47 is shown mounted in the upper surface of the housing 19; however, it may equally well be disposed on the brush carrier plate itself since the housing 19 and the brush carrier plate 78 are rigidly interconnected.

FIG. 6 shows another embodiment of the generating system. Details of lead feed-through, and transmitter and antenna placement, have been omitted. FIG. 6 has certain similarities to the structure shown in FIG. 4. Here, as in FIG. 4, the mounting stud 27 is rigidly affixed to the housing 19 to drive the housing into rotation as the vehicle moves along. A shaft 80 is securely affixed to the stud 27, and is driven thereby. A perforated drive gear 82 is rigidly affixed to shaft 80, and is configured with a circular array of drive holes 84 around the periphery thereof. A pendulum gear carrier 86A of appropriate weight is freely rotatable about shaft 80 on bearing 88. The gear carrier 86A supports a freely rotatable vertical shaft 90, disposed at right angles to the shaft 80, and is held in place by spindle bearings 92 at both ends, the lower spindle bearing 92 being retained in place by two collinearly disposed set screws 94. Shaft 90 carries a sprocket gear 96, which engages the holes 84 of the perforated drive gear 82. The pendulum assembly, being freely rotatable about the driven shaft 80, remains in a substantially perpendicular disposition at all times. The rotation of shaft 80 is thus transmitted to rotate the sprocket gear 96, which reverses rotation by engaging perforations 97 of a second driven perforated gear 98 mounted on armature hub 64, carrying pancake armature 66. The armature hub 64 is freely rotatable about shaft 80, being carried on bearing 100. A magnetic structure 69, consisting of an array of magnets 68 and a return flux plate 70 rotating with housing 19, induces a voltage in the armature 66, which is picked up by a brush system similar to that shown in FIG. 5. It will be noted that the armature 66 is driven in the opposite direction from that of the housing 19, resulting in a relative rotation rate between them equal to twice the housing rotation rate.

FIG. 9 represents another embodiment of the inventive system, having a narrow profile and wherein the entire structure rotates, with the exception of the armature assembly. This is accomplished by affixing a weight 110 to the armature hub 64 and armature 66, the armature hub being freely rotatable with respect to the shaft 80. Mounting stud 27, housing 19, shaft 80, the brush carriers and the magnetic structure assembly are all carried around with the housing as the wheel rotates. Weight 110, through hub 64, keeps the armature 66 substantially non-rotating, the induced voltage being picked off by a brush assembly as in the embodiment of FIGS. 6 and 8.

Figure 11:
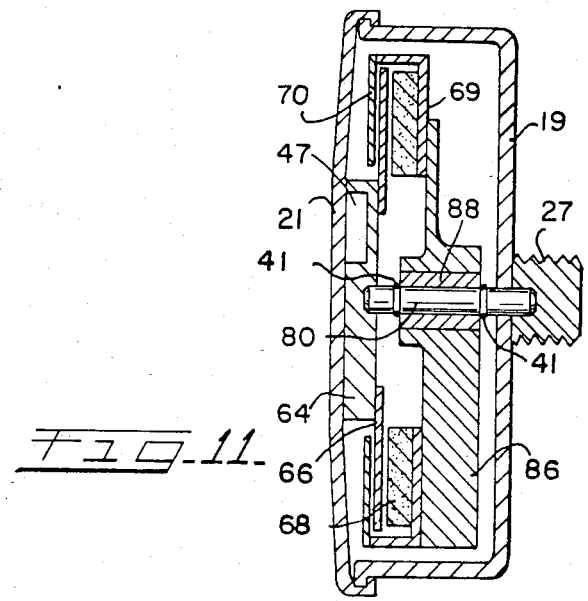
FIG. 11 shows another embodiment of the invention, employing a direct drive.

FIG. 11 is a cross-sectional view of still another embodiment of the present invention, further minimizing the narrowness of profile. FIG. 11 includes the mounting stud 27, casing 19 and cover 21, similar to the embodiment of FIG. 1. The structure of FIG. 11 includes a pendulum unit 86, similar to that shown in FIG. 1, wherein the weight of pendulum 86 is rotatably mounted on shaft 80 by suitable bearing assembly 88. Note, in this embodiment, that housing 19 rotates while the pendulum 86 remains relatively stationary. A pancake armature 66 is mounted on hub 64 and affixed to shaft 80; and, thus, the armature 66 rotates with the housing 19. In this instance, the permanent magnets 68 are mounted on a suitable holder 69, with return flux plate 70, then onto the pendulum 86, and remain substantially stationary with the pendulum 86 when the armature 66 rotates with the stud 27 and housing 19. The armature hub 64 contains the transmitter 47 and, therefore, needs no slip rings, having a direct connection to the armature windings. The whole wire system, pancake armature, transmitter, antenna and sensor switch rotate together. Note that, in this embodiment, the housing 19 can be made quite narrow in longitudinal dimension which, in many cases, provides an advantageous structure for mounting onto the wheel of the associated vehicle.

The present invention discloses a wheel-mounted electrical power generator for a radio warning system actuated by tire pressure sensors, which is capable of providing a warning to the driver of the vehicle of low inflation in each tire sensed. The unit is self-contained and weatherproof, requiring external connection only to a tire pressure sensor, and in some designs to an external antenna. The generators disclosed also employ overspeed gearing systems capable of providing substantial output voltage at very low wheel rotation rates.

While, for the purpose of illustration, various forms of this invention have been disclosed, other forms thereof may become apparent to those skilled in the art upon reference to this disclosure; and, therefore, this invention shall be limited only by the scope of the appended claims. For example, belts, or gear chains and sprockets, may be used in lieu of gears. Also, the alarm system employed need not be of the radio frequency transmitter variety, but may alternatively employ a wheel-mounted alarm, such as a flashing lamp, to convey a visible warning to the driver.

I claim:
1. A vehicle-mountable electrical power generating system for a wheeled vehicle, comprising, in combination, a housing, first mounting means for mounting said housing along the axis of rotation of a wheel for rotation with said wheel, second mounting means in said housing extending along the axis of rotation of said wheel, pendulum means suspended from said second mounting means, a rotatable electrical potential generating means including a generator shaft means, said generating means mounted with said pendulum means in para-axial relation to the axis of rotation of said wheel, drive means mounted for rotation with said housing and connected to rotate said generator shaft means of said generating means, said drive means having a substantially different diameter than said generator shaft means whereby rotation of said wheel causes said drive means to rotate said generator shaft means of said generating means at a selected rate higher than the rate of rotation of said wheel thereby generate electrical power.

2. A system as in claim 1 wherein said drive means is mounted to have its axis of rotation aligned with the axis of rotation of said wheel, and said generating means is mounted to have its axis of rotation spaced from the axis of rotation on said wheel.

3. A system as in claim 1 wherein said drive means comprises a rotatable gear, and said generator shaft means including gear means having a sufficiently high gear ratio whereby said generating means are actuated at a relatively high rate to provide power for powering a signal transmitter even when the vehicle is moving at a relatively slow rate of speed.

4. A system as in claim 5 wherein said generating means includes a pancake armature, and said armature is affixed to said shaft be driven by said drive gear means.

5. A vehicle-mountable electrical power generating system for a wheeled vehicle, comprising, in combination, a housing, first mounting means for suspendably mounting said housing along the axis of rotation of a wheel to maintain said housing relatively stationary when said wheel is rotating, second mounting means in said housing extending along the axis of rotation of said wheel for rotation with said wheel, an electrical potential generating means mounted in offset relation to the axis of rotation of said wheel, a drive shaft for actuating said generating means, drive gear means mounted for rotation with said second mounting means, and driven gear means mounted to drive said shaft and connected to be driven by said drive gear means, whereby rotation of said wheel causes said generating means to generate electrical power.

6. A vehicle-mountable electrical power generating system for a wheel of a vehicle, comprising, in combination, a housing, first mounting means for mounting said housing along the axis of rotation of said wheel to permit said wheel to rotate relative to said housing, an armature shaft, a pancake armature mounted on said armature shaft, driven gear means mounted on said shaft, drive gear means mounted on said first mounting means to be rotatable upon rotation of said wheel, and engaged to drive said driven gear means and said armature shaft, and magnet means mounted in said housing and operatively coupled to said armature, where rotation of said armature causes an electrical potential to be generated.

7. A system as in claim 6 wherein said first mounting means includes a bearing means, gear shaft means extending along the axis of rotation of said wheel for rotating in said bearing means to thereby permit said housing to remain relatively stationary when said wheel is rotating.

8. A system as in claim 6 wherein said housing is eccentrically mounted along the axis of rotation of said wheel.

9. A system as in claim 6 wherein weight means are mounted on said housing to provide a pendulum effect.

10. A system as in claim 6 wherein said drive gear means is mounted to have its axis of rotation aligned with the axis of rotation of said wheel, and said driven gear means is mounted to have its axis of rotation para-axial to the axis of rotation of said wheel.

11. An electrical generator system for mounting on a rotating member about a substantially horizontal axis, said generator system powered by the rotation of said rotating member, said generator system comprising:
 a magnetic field source for producing a magnetic field;
 an armature, said field source and armature being rotatable with respect to one another, said armature having at least a portion of its windings disposed to be operatively energizable by said field to produce an electrical voltage;
 pendulum means journaled and disposed to be slideably suspended about the axis of rotation of said rotating member so as to be held in a substantially non-rotating condition during rotation of said rotating member;
 overspeed rotary drive means coupled to said rotating member and said pendulum means, and driven by the relative rotation therebetween; and
 output means for said drive means being disposed and coupled to produce a relative rotation between said magnetic field source and said armature at a rotation rate greater than the rotation rate of said rotating member.

12. A generating system as in claim 11 further including a housing for said system, said housing being mountable on said rotating member, said overspeed rotary drive means comprising:
 (a) a first rotatable shaft means extending along said axis;
 (b) first rotatable gear means mounted on said shaft means;
 (c) second rotatable gear means including a rotatable second shaft means, said second gear means operatively engaging to said first gear means to be rotating at a relatively faster rate than said first gear means, and said second shaft means journaled on said pendulum means and hold in a relatively stationary axial position thereby;
 (d) third gear means mounted on said second shaft means, and rotatable with said second shaft means;
 (e) fourth gear means journaled on said first shaft means and operatively engaging said third gear means; and
 (f) said armature being operatively affixed to said fourth gear means whereby as said rotating member and said housing rotates, said fourth gear means and said armature are driven at a relatively much higher rate of speed to obtain a rotation rate greater than the rotation rate of said rotating member and thereby generate an electrical potential even with a slow rate of rotation of said rotating member.

13. A generating system as in claim 11 wherein said armature is a pancake armature circular in configuration, and said magnetic field source comprises a plurality of magnets mounted in spaced relation adjacent the periphery of said armature whereby the speed at which the periphery of the armature moves past the magnets is maximized to provide electrical power output from the generator system even at relatively low rate of rotation of said rotating member.

14. A vehicle-mountable electrical power generating system for a wheeled vehicle, comprising, in combination, a housing, a mounting means for rotatably mounting said housing along the axis of rotation of a wheel, an internal coaxially-mounted shaft in said housing, a pancake armature, an armature hub, said armature affixed to said hub, a weight mounted to said hub, bearing means having an inner race and an outer race, said hub affixed to the outer race of said bearing means, said weight maintaining said armature hub substantially stationary, the inner race of said bearing means affixed to said shaft, whereby the pancake is substantially stationary with respect to said shaft and independent thereof, and a magnet means affixed to said housing and rotating therewith in operative association with said pancake armature, whereby rotation of said wheel causes said generating system to generate an electrical potential.

15. A system as in claim 14 wherein the pancake armature has flat copper windings on both sides of a thin supporting ring of dielectric material, with properly spaced winding turns radially extended from the inside diameter to the outside diameter and interconnected over the outer and inner edges of said supporting ring.

16. A generating system as in claim 14 wherein the mounting of the armature to the hub and of the magnet means to the housing are interchanged.

17. An electrical power generating system, comprising, in combination:
    a housing;
    a drive shaft in said housing;
    a rotatable member;
    mounting means for said housing, said drive shaft being coaxial with said rotatable member to be rotatable therewith;
    pendulum means slideably mounted to and suspended from said drive shaft;
    an electrical potential generating means mounted on said pendulum para-axial to said drive shaft;
    an armature shaft for said generating means;
    drive gear means mounted on said drive shaft and rotatable with said housing;
    driven gear means mounted on said armature shaft to engage said drive gear means, whereby rotation of said rotatable member causes the drive gear to drive said driven gear and thereby control the ratio of speeds between said drive shaft and said armature shaft.

* * * * *